United States Patent [19]
Hofstetter et al.

[11] Patent Number: 5,582,851
[45] Date of Patent: Dec. 10, 1996

[54] INJECTION MOLDING DEVICE

[75] Inventors: Otto Hofstetter; Luis Fernandez, both of Uznach, Switzerland

[73] Assignee: Otto Hofstetter AG, Uznach, Switzerland

[21] Appl. No.: 316,361

[22] Filed: Oct. 3, 1994

[30] Foreign Application Priority Data

Oct. 6, 1993 [CH] Switzerland ................. 8/93

[51] Int. Cl.$^6$ ................................................. B29C 45/22
[52] U.S. Cl. ................... 425/562; 425/564; 425/566; 425/570; 425/572; 425/573
[58] Field of Search ......................... 425/562, 563, 425/564, 570, 572, 573, 565, 566

[56] References Cited

U.S. PATENT DOCUMENTS

| 4,710,113 | 12/1987 | Krishnakmmar et al. |  |
|---|---|---|---|
| 5,037,285 | 8/1991 | Kudert et al. | 425/145 |
| 5,375,994 | 12/1994 | Friderich et al. | 425/562 |

FOREIGN PATENT DOCUMENTS

| 0307058 | 3/1989 | European Pat. Off. |
|---|---|---|
| WO91/16188 | 10/1991 | WIPO . |

*Primary Examiner*—Tim Heitbrink
*Attorney, Agent, or Firm*—Nath & Associates; Gary M. Nath; Richard E. Campbell

[57] ABSTRACT

A multi-plate injection molding tool has multiple cavities. It includes a hot-runner plate, a hot-runner distribution block adjacent to the hot-runner plate, and a plurality of hot-runner nozzles. The hot-runner distribution block is a monolithic seamless metal block. A lower die plate is removably attached to the hot-runner plate, and an upper die bolster is adjustably attached to the lower die plate and is movable along fixed guide columns. The upper die bolster comprises a base plate, a stripping plate and a slide plate. A plurality of form cores are supported on the upper die bolster, and a plurality of annular stamps are attached to the lower die plate, each being around a form core and each having a conical exterior surface tapered towards the lower die plate, and cooperating with a die; a plurality of dies is carried by the lower die plate, and each has a mating conical surface for receiving the conical surface of a stamp in close fit therewith when the molding tool is closed. The hot-runner distribution block has at least two channels for receiving two different material components from injectors, the channels comprising main channels and branch channels of equal length between their inlets and outlets, and there is a temperature stabilizing construction in the hot-runner distribution block and the hot-runner nozzles. A fluid operated valve is provided for selectively releasing to a nozzle, or for blocking, the different material components.

11 Claims, 3 Drawing Sheets

5,582,851

INJECTION MOLDING DEVICE

BACKGROUND OF THE INVENTION

The present invention relates to a multi-plate injection molding device or tool having multiple cavities and a hot runner distribution block for injection molding of multilayer preforms, in particular forms made of the thermoplastic resin PET, which is suitable for blow-stretching, as well as to a hot runner block for such a molding device and a valve for control of the injection of multiple thermoplastic resins.

Molding devices for injection molding multiple multilayer forms made of PET-like materials are well known and are extensively used in the production of preforms, such as are required in large numbers by the beverage industry for so-called PET bottles. These molding devices must meet unusually high standards because in processing PET and its copolymers the specific features of the material must be taken into careful consideration. For example, the processing temperature of PET has proven to be a critical factor. If the temperature is too low, then crystalline zones occur, which may result in cloudiness and brittleness of the material; if, on the other hand, the temperature is too high, then a high acetaldehyde content occurs and the PET begins to disintegrate, which, especially in the beverage and food industry, leads to an undesired impairment in the taste of the product. Also, PET reacts extremely sensitively to pressure fluctuations and shearing forces, which can also lead to local crystallization effects. Therefore, there must be kept in mind not only the laminate flow reaction of the PET mass and the injection rate, but also the regular temperature and pressure distribution within the PET material. These and other parameters affect in particular the regularity and homogeneity of the layer thicknesses as well as the density distribution within the manufactured preforms.

A device or tool with which multilayer preforms can be manufactured is very complex and is, for example, described in EP-307,058. This patent describes a hot-runner block for eight form cavities and five different synthetic or polymer masses. The individual synthetic masses are caused to fill separate press-out cylinders and are guided to the individual nozzles arranged in the hot runner block over a single, mutual mouth piece. Unfortunately, this construction has proven to be extremely complicated to maintain; in particular because of the T-and Y-splitters used, it is not easily adjustable and is not suitable for more than eight form cavities. In particular, the temperature conditions in the individual channels cannot be satisfactorily balanced because, among other things, they lie on different levels in the hot runner block and are therefore exposed to the temperature gradients inherent in the hot runner block. The small diameters of the individual channels lead to friction manifestations in PET material which undesirably alter the material, and also, this device does not permit a feed pressure of more than 345 bar, because otherwise it begins to leak.

In U.S. Pat. No. 4,710,118 there is, for example, described apparatus which is suitable for processing PET. The described construction with four form cavities is designed to work with three different materials, new PET, recycled PET and another thermoplastic material. The plasticized materials are each fed into a dosing unit by a squeezing cylinder and are pressed through a distribution valve to fill the cavities. Unfortunately, this construction is also not suitable for processing PET form masses, in particular because the channels through which the plasticized material is conveyed to the nozzles have different lengths, thereby causing the filling density in the separate form cavities to differ, which is undesirable. Aside from this, the temperature regulation of the conveyed material is extremely complex and insufficient, and the shearing forces acting on the material in the distribution valve produce undesired crystallization effects.

In the injection molding device as described in, for example, PCT Publication WO 91/16188, the above noted drawbacks do not occur. In this device, special attention has been paid to the length of the conveyor channels, thereby resulting in a regular temperature distribution in the especially constructed distribution blocks. Unfortunately, however, it is not possible with the disclosed structure to avoid an undesirable mixing of the form masses, which is not acceptable, in particular when manufacturing preforms for the beverage industry. Further, the use of numerous distribution blocks causes problems in the fine adjustment and thereby in the maintenance of the equipment. This system is therefore totally unsuitable for the manufacture of preforms comprising differently large proportions of different materials.

SUMMARY OF THE INVENTION

The present invention is a hot runner molding device or tool, which comprises in particular an upper stamp plate and a lower die plate, which seal the form cavities; during the filling and hardening process a pressure of approximately 350 tons is applied to the tool. Conical surfaces having manufacturing tolerances less than 5/1000 mm interengage. This permits a working conveyor pressure of the plastic of 900–1000 bar without leakage in the form cavities and allows the production of high quality PET forms, i.e. the form cavities can be evenly filled with PET and also smaller quantities of intermediate layer material can be pressed into the form cavities under the same pressure conditions. In order to avoid leakages in the nozzle area and in particular to avoid the formation of material strands at the nozzle exit, the apparatus according to the present invention comprises a pneumatic valve as well as a monolithic, i.e. not separable, distribution block whose channels each have an equal length from their entrance openings to their exit openings, and whose diameters adjustably reduce themselves at each junction according to the conveying volume and pressure.

An object of the present invention to provide an injection molding apparatus by means of which PET masses and their copolymers for the manufacture of multilayer preforms can be excellently processed, i.e. the production of multilayer preforms with a homogenous density throughout the entire preform. In particular, it is an object of the present invention to provide an injection molding tool which does not have the disadvantages of the known injection molding tools, i.e. does not permit the different materials to mix in the conveying channels, yet works simply but perfectly even with very many, e.g. seventy-two cavities, can be easily maintained, provides high precision, and which can convey varyingly large proportions of different PET masses into the form cavities, yet still assure a regularly distributed filling of the entire cavity.

In order to provide the required homogenous temperature distribution for an evenly packed filling of the form cavities, the distribution block is arranged in a hot-runner plate and, in particular, is enclosed by covering metal sheets. A separately heated snorkel piece extends from the heat plate of the molding tool and connects the distribution block to the extruder.

The molding tool according to the present invention for the first time permits the simultaneous forming of several multilayer preforms made of PET, the individual layers having a homogenous density distribution and a regular layer thickness.

Other advantages of the present invention will be apparent from the specification, drawings and claims.

DESCRIPTION OF THE PREFERRED EMBODIMENT

Figure 1:
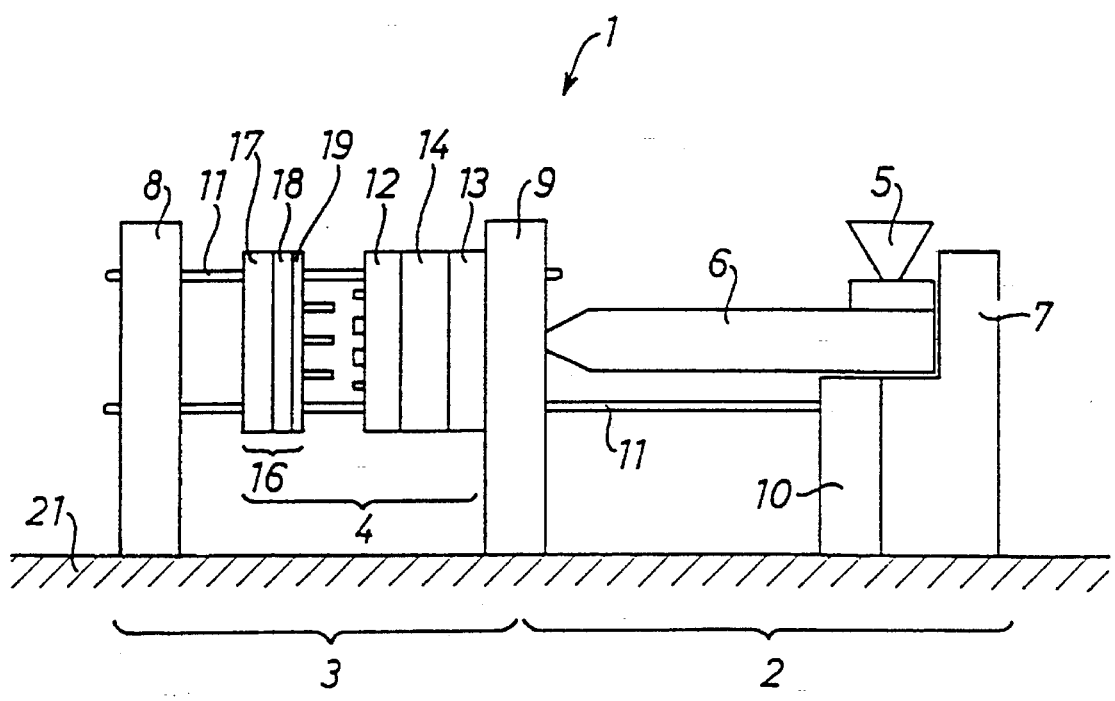
FIG. 1 is a schematic diagram of an injection molding machine with forming tool in accordance with the present invention.

The basic construction of an injection molding machine in accordance with the present invention is shown in FIG. 1. Basically, in all injection molding machines 1 there is a first subassembly, the injection unit 1, and a second subassembly, the tooling unit 3. The synthetic material to be processed is prepared with the injection unit 2, and is pressed into the form cavities parisons of the forming tool 4 of the tooling unit 3. For this purpose, the synthetic material, in this case PET, which is commercially available as granules, is introduced into the funnel 5, and by means of a rotating conveyor worm arranged in the extruder or injection aggregate, is brought into a heated, plasticized condition, and is held ready for further processing in a collection area at the tip of the injection aggregate 6. During one injection cycle the cavities in the forming tool 4, being cooled to a solidifying temperature, are filled under pressure, the so-called injection or conveying pressure, with this hot synthetic mass. To compensate for the shrinkage of the material which occurs as it cools, more synthetic mass is added under a certain lower pressure for a certain period of time, until the mass has solidified completely and cannot contract any further. After a further cooling period the forming tool 4 is opened and the solidified forms are extracted. The correct procedure for such an injection cycle is coordinated by a control unit 7, which also regulates the temperature in the individual assembly groups. At this point, it should be specifically mentioned that the temperature of the synthetic mass can differ greatly from the temperature of the conveying channels, due to its poor heat transfer coefficient and because of uncontrollable flow effects. A controlled temperature regulation within the synthetic mass is not easily possible, i.e. by conventional means. The mechanical stability of the entire injection molding machine 1 is provided by fixed machine plates 8, 9 and 10, the machine bed 21, as well as massive conveyor columns 11.

Figure 2:
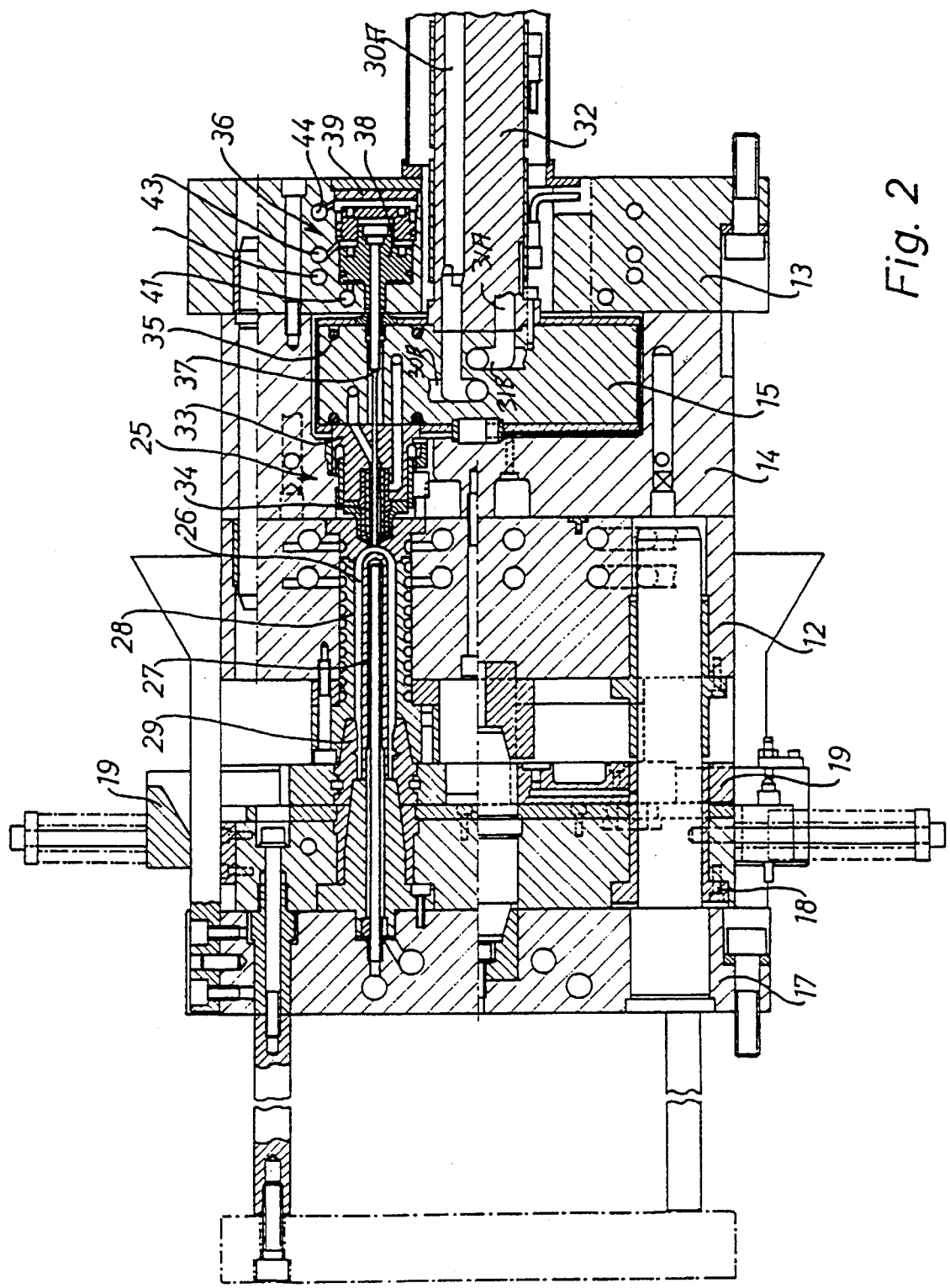
FIG. 2 is a cross section through a forming tool according to the present invention.

The forming tool 4 according to the present invention is basically made of six individual plates, and, in a preferred embodiment, comprises forty-eight form cavities, thus making it a manifold injection molding tool. For this tool to be particularly suitable for processing PET, it is necessary to heat those areas in which the PET material is conveyed to the feeder nozzle. In particular, as shown in FIG. 2, the forming tool 4 according to the present invention comprises a hot runner plate 14 situated between a lower die plate 12 and a head plate 13 on the injection machine side, and which contains a hot runner distribution block or manifold 15 according to the present invention. An upper die bolster 16 comprises a base plate 17 and a stripping plate 18 with a slide plate 19.

FIG. 2 shows the construction of a preferred embodiment of the forming tool 4 for two different material components. The material which has been plasticized in the extruders arrives directly into the hot runner distribution block 15 through separated main channels 30A and 31A extending in an axially extending snorkel piece 32 which is part of injector 6, and which extend into the hot runner distribution block 15, which together with snorkel piece 32 form a unit which is carried by the hot runner plate 14. The diameters of the individual branch channels 30B, 31B are adapted to the quantities of the individual layers of the multilayer forms which are conveyed during the forming steps. Each branch channel for a specific material component lies preferably in a plane which is parallel to the plane of the hot runner distribution block 15, i.e., in an individual plane perpendicular to snorkel piece 32 and to the main channel to which it is connected. It has proven to be of utmost importance that the geometry of the branch channels is such that each branch channel, e.g. 30B, 31B, within the hot runner distribution block 15 has the same length. According to the present invention it is very important that the diameters of the branch channels become appropriately smaller, i.e. the diameter is reduced to adjust for the lessened quantity conveyed after each branching-off, in order to avoid any reduction in the conveying pressure in the entire distribution block.

On the side of the cavities these branch channels each has an outlet opening at a hot channel nozzle 25, which comprises a removable nozzle holder 33 and a nozzle body 34. The nozzle body 34 comprises several nozzle inserts fitted into each other, between which the different synthetic material components are conveyed to the nozzle tip. Heating elements 35 maintain the required temperature in the hot channel distribution block 15, as well as in the nozzle holder 33 and thereby also in the nozzle body 34.

A pneumatically controlled valve 36 controls a movable pin 37, located in the nozzle tip area of the nozzle body 34, for releasing or blocking the different components. As described, in the preferred embodiment of the present invention as shown also in FIG. 3, three pin positions are sufficient for a three-layer filling of one cavity. In a first position the pin 37 is partially retracted to enable the cavity to be filled with a first component, especially with new PET or raw material. In a second retracted position, the pin 37 enables a second component or recycled PET can be forced into the form cavity, described below, before the pin 37 is pushed forward to close the nozzle outlet. Typically, the different components are injected with a pressure of 700–800 bar for a duration of approximately 2–8 seconds. Experience shows that it is very important for the quality of the manufactured product that the individual components have the same temperature.

Figure 3:
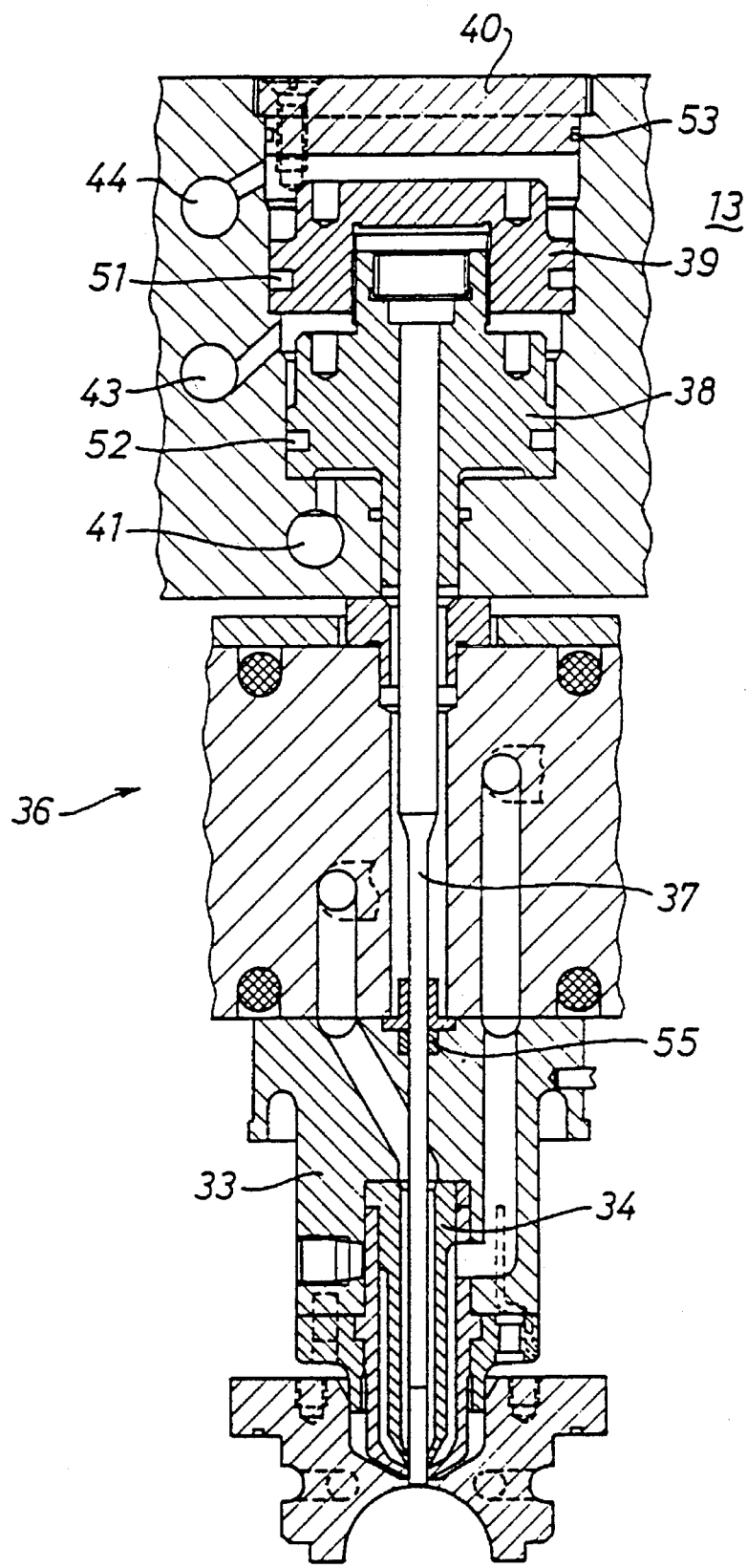
FIG. 3 is an enlarged view of a valve shown in FIG. 2 according to the present invention.

It is particularly advantageous to locate the valve 36 as shown in FIG. 3, in a cavity in head plate 13 serving as a pneumatic cylinder. In particular the valve 36 comprises a first piston 38 guiding the pin 37 and having an extension, over which a second piston 39 is movably arranged. A hermetically sealing cylinder lid 40 pressure seals the cavity in head plate 13. Suitably arranged pressure lines 41, 43 and 44 contain fluid which selectively cause the individual pistons and thereby also the pin 37 to be brought into the desired position. In a preferred embodiment, the individual pressure lines have different high pressures. Thus, for example, the outer pressure line 44 can have 20 bar, the middle pressure line can have 10 bar and the inner pressure bar 41 can have 5 bar. The position of the individual pistons 38 and 39 as shown in FIG. 3 is achieved when the individual pressure lines are under pressure as described above. If the pin 37 is to be retracted to release the first synthetic material component, it is merely necessary to reduce the pressure in the middle pressure line 43. The first piston 38 is then moved into contact with the second piston 39 by the pressure of the inner pressure line 41. In order to bring the pin 37 into a second retracted position which admits the second synthetic material component, the pressure in the outer pressure line 44 is decreased in the same manner. This results in the two pistons 38, 39 moving together up to the cylinder lid 40. In order to stop the flow of material through valve 36, first the outer pressure line 44 is brought back under pressure, thereby moving the two pistons 38, 39 together in the closing direction. Only when the middle pressure line 43 has also again been pressurized through the movement of the first piston is the feed flow of the first synthetic material component stopped.

Pressure resistant seals 51, 52, which are arranged at the individual pistons and at the cylinder lid 53, permit a perfect functioning of the hydraulic valve 36. An axial seal 55, located in the nozzle holder 33, is of utmost importance for preventing a lack of pressure regulation between the pistons 38, 39 and the hot channel nozzle 25, and so that the pressurized vapors of the different heated material components do not escape along the nozzle pin 37 through the nozzle holder 33, and precipitate on the piston walls or on the nozzle pin and thereby negatively effect or block the movability of the individual parts of the valve 36. In the present invention this problem is solved by means of a gas-tight axial seal 55 made of temperature resistant synthetic material.

The form cavity lies between the outer surface of the form core 27 and the inner surfaces of the die 28 and stamp 29. The die 28 will be seen to be carried by lower die plate 12, and to extend through it, from the face of lower die plate 12 engaging the hot runner plate 14. Die 28 has a recess, as shown in FIGS. 2 and 3, for receiving the end of nozzle body 34. The opposite end of the die 28 is provided with a female conical surface which receives in mating relationship a male conical surface of the stamp 29. These conical surfaces have a manufacturing tolerance of less than 5/1000 mm. The stamp 29 is attached to and carried by the slide plate 19, which, as shown in FIG. 1, is movable away from lower die plate 12 and die 28.

Although only a single valve 36, hot channel nozzle 25 and die 28, stamp 29 and form 27 are shown in FIGS. 2 and 3, a large number of such structures may be provided, so that there may be, for example, seventy-two molded objects such as bottles made in a single operating cycle.

The easily disassembled construction of the hot runner plate 14 permits, for the first time, a simple change-over from a 2-channel-tool to a 3-channel-tool, whereby only the hot runner distribution block 15 with its snorkel 32 and the hot channel nozzle 25 have to be replaced. All other tool plates can be used as before. The seamless construction of the hot runner distribution block 15 and the pressure tight valve arrangement allow an operation at high conveying pressures, which not only reduces the cycle time but also, very importantly, permits a more exact temperature control in the hot channels.

Modifications to the described molding tool according to the present invention will be obvious to the expert. For example, specific steps can be taken to further improve the heat contacts between the heating elements 35 and the nozzle holder 33 or the hot runner distribution block 15. In particular, steps can also be taken to influence the flow properties of the individual components, or to increase the mechanical precision for closing the upper stamp and lower die bolsters.

The claims and specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

We claim:

1. A multi-plate injection molding tool having a plurality of cavities for injection molding multilayer preforms, the molding tool comprising:

a fixed machine plate having a head plate attached thereto, a hot runner plate removably connected to said head plate, a hot-runner distribution block and a plurality of hot-runner nozzles removably attached to said hot-runner plate, said hot-runner distribution block being a monolithic, seamless metal block, a lower die plate removably attached to said hot runner plate, an upper die bolster adjustably attached to said lower die plate and movable along fixed guide columns, said upper die bolster comprising a base plate, a stripping plate and a slide plate, a plurality of form cores supported by said upper die bolster and removably connected to the base plate, a plurality of annular stamps attached to said slide plate, each annular stamp being around a corresponding one of said form cores, each said stamp comprising an exterior surface which is conically tapered towards the lower die plate, a plurality of dies carried by said lower die plate and each having a mating conical surface for receiving each said stamp in close fit therewith when the molding tool is closed, thereby producing a molding cavity between each said form core and each said stamp and die, said hot runner distribution block having at least two channels, each for receiving a different material component from an injector, means for stabilizing the temperature in the hot-runner distribution block and the hot-runner nozzles, and a pneumatic valve associated with each of said nozzles for selectively controlling the flow of one of said material components through said nozzle.

2. A multi-plate injection molding tool according to claim 1, and further comprising means for pressing said closely fitting conical surfaces of said stamps and the die when the molding tool is closed with a closing pressure of approximately 350 tons.

3. A multi-plate injection molding tool according to claim 1, wherein the conical surfaces of the stamps and dies have a tolerance in the distance therebetween of less than 5/1000 mm.

4. A multi-plate molding tool according to claim 1, wherein said hot runner distribution block has main channels for connection to an axially extending injector and transverse branch channels which branch off therefrom, each said branch channel being in a separate plane transverse to the main channel to which it is joined.

5. The multi-plate molding tool according to claim 4, wherein the length of a main channel and the branch channel joined to it between the inlet opening to each main channel for receiving material from an injector and the outlet opening of a branch channel at a said hot-runner nozzle is the same for each other such main channel and branch channel.

6. The multi-plate molding tool according to claim 5, wherein the diameter of each branch channel is reduced after each branching off to avoid reduction in the conveying pressure of each component of the material for forming multilayer preforms.

7. The multi-plate molding tool according to claim 1, wherein said hot runner distribution block has main channels for connection to an axially extending injector and branch channels which branch off therefrom, wherein the length of a main channel and the branch channel joined to it between the inlet opening to each main channel for receiving material from an injector and the outlet opening of a branch channel at a said hot-runner nozzle is the same for each other such main channel and branch channel.

8. The multi-plate injection molding tool of claim 1, wherein said pneumatic valve comprises:

a cavity having a first piston and a second piston movable therein, a pin carried by said first piston and extending from a first side thereof, said first piston having a second side opposite said first side and said second piston having a first side adjacent said second side of said first piston and said second piston having a second side opposite the first side thereof, a first pressure line connected to said cavity on said first side of said first piston, a second pressure line connected to said cavity between said second side of said first piston and said first side of said second piston, and a third pressure line connected to said cavity at the second side of said second piston.

9. A multi-plate injection molding tool according to claim 8, wherein said cavity is in said head plate, and wherein said movable pin extends through said hot runner distribution block into said hot-runner nozzle, and a gas tight axial seal around said movable pin between the hot-runner nozzle and the hot runner distribution block.

10. A hot runner distribution block for use in a multi-plate molding tool to convey plasticized materials from an injector to a nozzle, said hot-runner distribution block comprising:

a plurality of main channels suitable for conveying different plasticized material components, each said main channel having at least one branch channel branching off therefrom in a predetermined geometrical arrangement, said branch channels each lying on planes being parallel to the plane of said distribution block, and wherein the length of a channel and branch channel between an inlet opening thereof to each main channel for receiving material from an injector and the outlet opening of a branch channel at a nozzle is the same for each other such channel and branch channel.

11. The hot-runner disbribution block of claim 10, wherein the diameter of each channel and branch channel is adapted to the conveying rate of each component of the material for forming multilayer preforms.

* * * * *